United States Patent
Newill

(10) Patent No.: US 9,246,321 B2
(45) Date of Patent: Jan. 26, 2016

(54) WIRING APPARATUS

(71) Applicant: Roger Fulton Newill, Virginia Beach, CA (US)

(72) Inventor: Roger Fulton Newill, Virginia Beach, CA (US)

( * ) Notice: Subject to any disclaimer, the term of this patent is extended or adjusted under 35 U.S.C. 154(b) by 0 days.

(21) Appl. No.: 14/576,731

(22) Filed: Dec. 19, 2014

(65) Prior Publication Data

US 2015/0280414 A1    Oct. 1, 2015

Related U.S. Application Data

(60) Provisional application No. 61/969,860, filed on Mar. 25, 2014.

(51) Int. Cl.
  *H05K 7/02*        (2006.01)
  *H02G 15/117*     (2006.01)
  *H02G 3/08*        (2006.01)
  *H02G 3/18*        (2006.01)

(52) U.S. Cl.
  CPC ............. *H02G 15/117* (2013.01); *H02G 3/083* (2013.01); *H02G 3/18* (2013.01)

(58) Field of Classification Search
  CPC ................................. H02G 3/18; H02G 3/083
  USPC .......................................................... 174/53
  See application file for complete search history.

(56) References Cited

U.S. PATENT DOCUMENTS

| | | | |
|---|---|---|---|
| 2,291,107 A | 7/1942 | Rybolt | |
| 3,489,985 A | 1/1970 | Martin | |
| 3,716,651 A | 2/1973 | Werner | |
| 3,860,739 A * | 1/1975 | Kloth | H01R 4/2437 174/503 |
| 3,935,637 A * | 2/1976 | Bunnell | H01R 4/2437 174/58 |
| 4,012,580 A | 3/1977 | Arnold | |
| 4,256,360 A * | 3/1981 | Debaigt | H01R 4/242 439/399 |
| 4,274,696 A * | 6/1981 | Long | H01R 24/76 439/222 |
| 4,500,746 A * | 2/1985 | Meehan | H02G 3/12 174/503 |
| 4,616,285 A | 10/1986 | Sackett | |
| 4,669,804 A * | 6/1987 | Munroe | H02G 3/18 439/398 |
| 5,399,806 A | 3/1995 | Olson | |
| 6,259,023 B1 | 7/2001 | Reiker | |
| 6,884,111 B2 * | 4/2005 | Gorman | H01R 4/44 174/53 |
| 7,497,273 B2 * | 3/2009 | Schoettle | H01R 13/665 173/53 |
| 8,353,716 B2 | 1/2013 | Keswani | |
| 2010/0288526 A1 * | 11/2010 | Meyer | H02G 3/123 174/58 |

* cited by examiner

*Primary Examiner* — Hung V Ngo
(74) *Attorney, Agent, or Firm* — Nixon & Vanderhye, PC

(57) ABSTRACT

Electrical wiring apparatus having a base with an outer opening. The base has cable entries at opposite ends thereof that have the stripped wire ends of cables mounted therein. A mounting post extends outwardly from the base which has spaced recesses therein adjacent to the mounting post. Links are slidably mounted on the mounting post in offset relation in the spaced recesses to engage and connect the wire ends of the cables at opposite ends of the base. A cover plate and/or associated electrical device can be removably mounted on the base over the outer opening thereof to engage the links and maintain them in engagement with the wire ends. The electrical device may have terminals engaging the links.

16 Claims, 6 Drawing Sheets

WIRING APPARATUS

CROSS-REFERENCE TO RELATED APPLICATIONS

This application claims the priority of Provisional Application No. 61/969,860 filed on Mar. 25, 2014.

BACKGROUND OF THE INVENTION

1. Field of the Invention

The present invention relates to electrical wiring apparatus and, more particularly, to electrical switches, receptacles or the like. It is constructed to make circuit and device installation safer, faster and simpler.

2. Description of the Background Art

Millions of electrical devices, such as switches, receptacles, light fixtures or the like are installed in homes and other environments each year. The circuit installation mechanics of these devices have not changed significantly since 1892 with the result that such devices in most cases are time consuming to wire and install, are subject to circuiting errors, require many parts and are not always safe and reliable in operation. The wiring apparatus of the present invention is not subject to these disadvantages and possesses many advantages over conventional wiring devices.

BRIEF SUMMARY OF THE INVENTION

In one embodiment of the invention, a receptacle having a rear base is fastened to a stud, with up to four end-stripped cables inserted in cable entries in the box. The cable entries may each have an automatic cable latch and a manual cable release, operable after installation is completed and a cover plate and associated device are lifted off. A ground wire from each inserted cable is positioned in a ground enclosure in the base where it contacts a subsurface grounding link. The ends of the positive wire and neutral wire of each cable are exposed toward the open front of the box at the back of link recesses in the base. A locating post projects toward the open front of the box from the base and is shaped non-symmetrically or otherwise to prevent improper positioning of connecting links.

A positive link and a neutral link of conductive material have offset openings therethrough that match the shape of the locating post and are positioned or slidably mounted over the locating post into link recesses in the base and onto the positive and neutral wires of the cables. The non-symmetrical openings in the links prevent improper positioning on the locating post. The links are insulated from each other at their overlapped central portions. The links each have four bare conductor legs which may be removed or trimmed if necessary by an installer to make or prevent connections between the appropriate positive and neutral wires. The links and thus the circuits are visible after the installation is completed by lifting off the cover plate and/or associated electrical device.

A cover plate and/or electrical device is secured to the front of the box to compress the links and wires to assure and secure electrical continuity.

It will be readily appreciated, therefore, that the wiring apparatus of the present invention has many advantages over the prior art, some of which are as follows:

1. The apparatus is constructed to easily connect and visually trace complex circuitry, as well as to connect devices to the circuitry;

2. A base is provided to position and secure the cables and wires to connect properly with the installed links;

3. The links are simple in construction and can be prefabricated for connections between the cables and other devices, and can be selected or trimmed by an installer as needed;

4. Cover plates and associated electrical devices can have terminals positioned and shaped to properly connect with the links and the base when installed thereon;

5. The apparatus is safe, simple and easy to install; and

6. It replaces the conventional junction box, cable locks, twisted wires, exposed ground wires, pigtails, wire nuts, and does not require the bending of such assemblies back into the box.

DETAILED DESCRIPTION OF THE INVENTION

Figure 1:
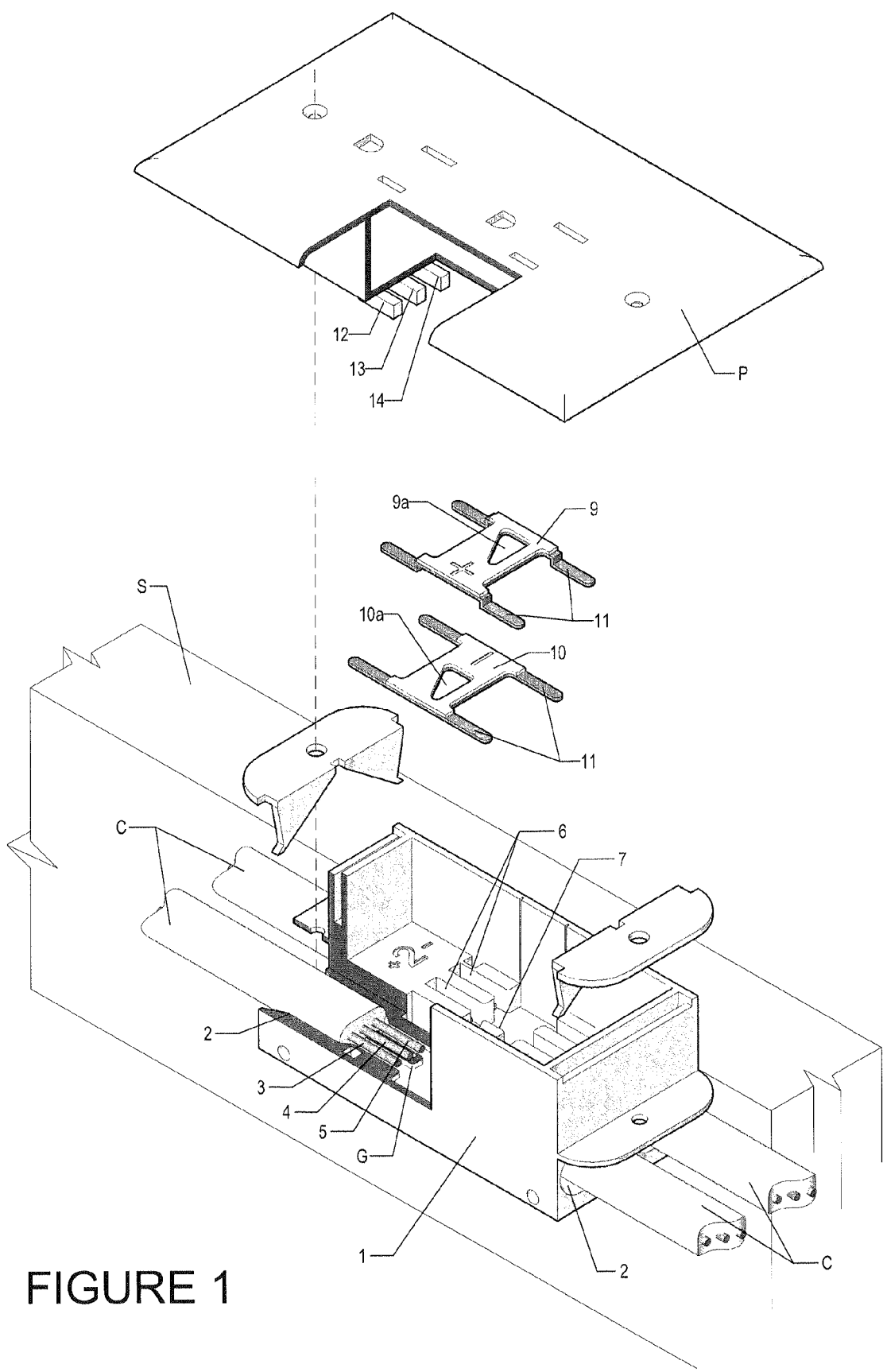
FIG. 1 is an exploded isometric view of one embodiment of a box or receptacle constructed in accordance with the principles of the present invention.

FIG. 1 illustrates a base 1 fastened to a stud S, with up to four end-stripped cables C inserted in cable entries 2 in the base 1. The cable entries 2 each have a cable latch of any suitable construction such as an automatic cable latch and manual cable release. For example, an upright leg of a link catches the inserted ground wire and that leg can be pushed away from the wire, releasing the cable, by downward pressure on the grounding link, operable after installation is completed and a cover plate and/or associated electrical device P are lifted off the base 1. The ground wire 4 from each inserted cable C (the middle of three wires in a cable) remains in a ground enclosure G, contacting a subsurface grounding link. The ends of positive wire 3 and neutral wire 5 of each cable C are exposed at the back of link recesses 6 in the base 1. A locating post 7 projects outwardly from the base 1, and is shaped non-symmetrically or otherwise to prevent improper positioning of the links 9 and 10.

A positive link 9 and a neutral link 10, of conductive material, are positioned over the locating post 7 into link recesses 6 and onto the four sets of wires 3 and 5. The order of insertion does not matter. The links 9 and 10 have offset openings 9a and 10a in their central sections through which the post 7 extends to prevent improper positioning on the post 7 and are insulated from each other at their overlapped central sections. The exposed conductor positive and neutral legs 11 do not overlap or touch each other. To differentiate between the links, and indicate their polarity per international safety standards, there may be black insulation on the positive link 9 and white insulation on the neutral link 10. The links each have four bare, conductor legs 11, able to be trimmed if necessary by an installer to make the desired connections between the appropriate positive and neutral wires. For example, in one embodiment—a single duplex receptacle not circuited to another device or circuit—there would be only one cable and each of the two links would have all but two legs 11 removed, or all four legs 11 on each link would remain with two not touching any wires and protected from accidental contact. The links 9, 10 and hence the circuits, are visible after the installation is completed with the cover plate and associated device P removed.

A combined cover plate and associated electrical device P (in this example a duplex receptacle) may be secured to the base 1 in any suitable manner to compress the links 9, 10 and wires 3, 5 to assure electrical continuity and security from accidental contact. Terminals 12, 13 and 14 may be located on the back face of the device P, contacting the positive and neutral link legs 11 and a ground terminal on the base 1 behind it. The cover plate and associated electrical device P may be one or separate pieces.

Figure 2:
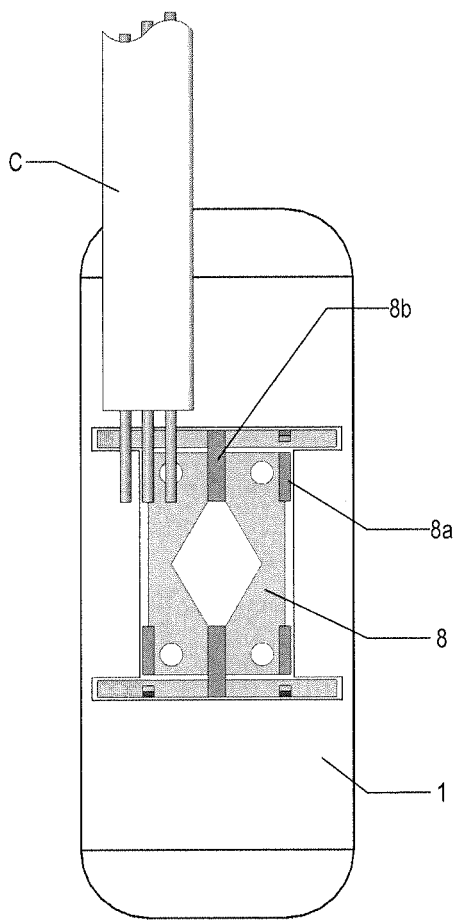
FIG. 2 is an elevational view, partly in section, of a portion of the apparatus as shown in FIG. 1, showing the subsurface and fixed grounding link inside the bottom of the base with raised areas to contact ground wires and other ground terminals.

FIG. 2 shows a subsurface, and fixed, grounding link 8 on the bottom of the base 1, with raised areas 8*a* and 8*b* to contact ground wires and the ground terminal of the electrical device P, respectively.

Figure 3:
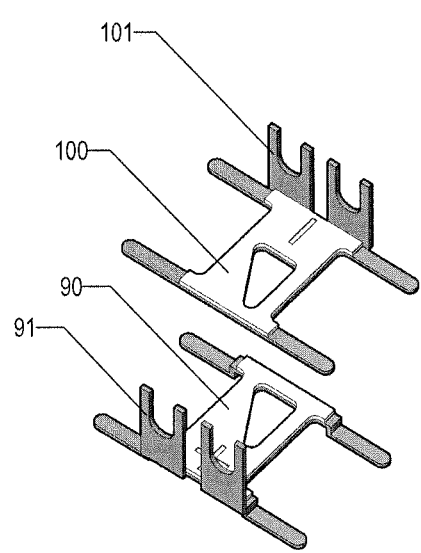
FIG. 3 is an isometric view of one embodiment of links that may be used to connect to screw terminals of devices without back terminals.

FIG. 3 shows modified links 90, 100 with contact arms 91, 101 to connect to the side screw terminals (not shown) of an electrical device P which does not have back terminals 12, 13 or 14 (FIG. 1).

Figure 4:
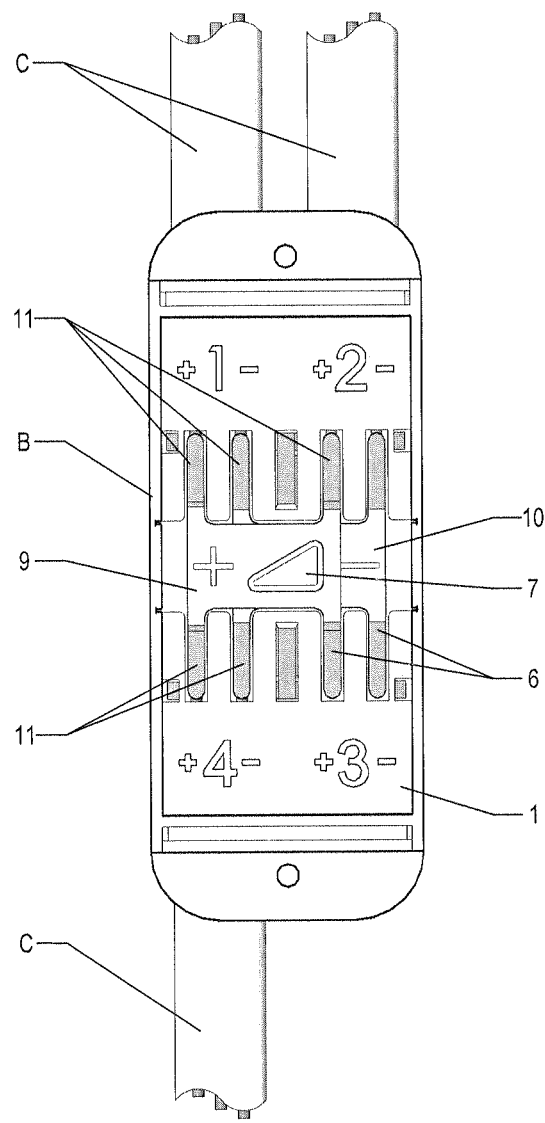
FIG. 4 is a front elevational view of the apparatus shown in FIG. 1 showing the installation of the links and visible connections with the face plate lifted off.

FIG. 4 shows the visibility of the circuit in the base 1 of FIG. 1 with the cover plate and associated device P removed, with no further disassembly necessary to inspect and understand the circuits without disassembling connections.

Figure 5:
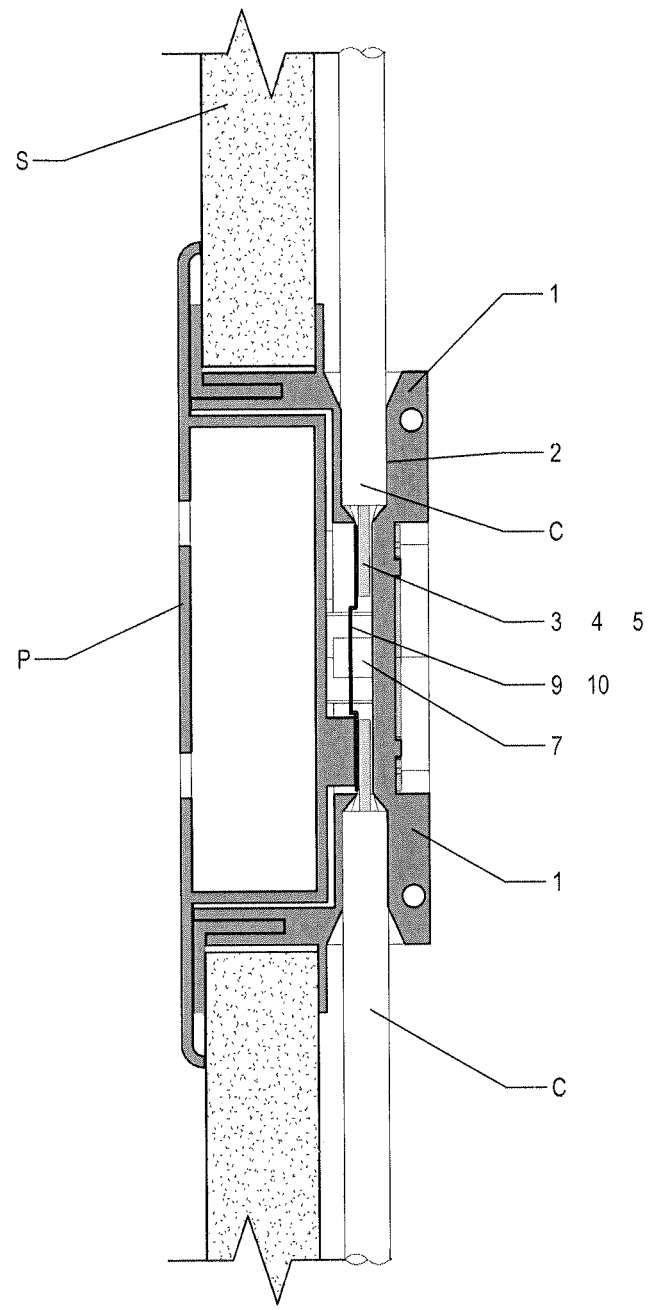
FIG. 5 is a side elevational view in section of the apparatus shown in FIG. 4.

FIG. 5 shows the circuit connections in the base 1 of FIGS. 1 and 4.

Figure 6:
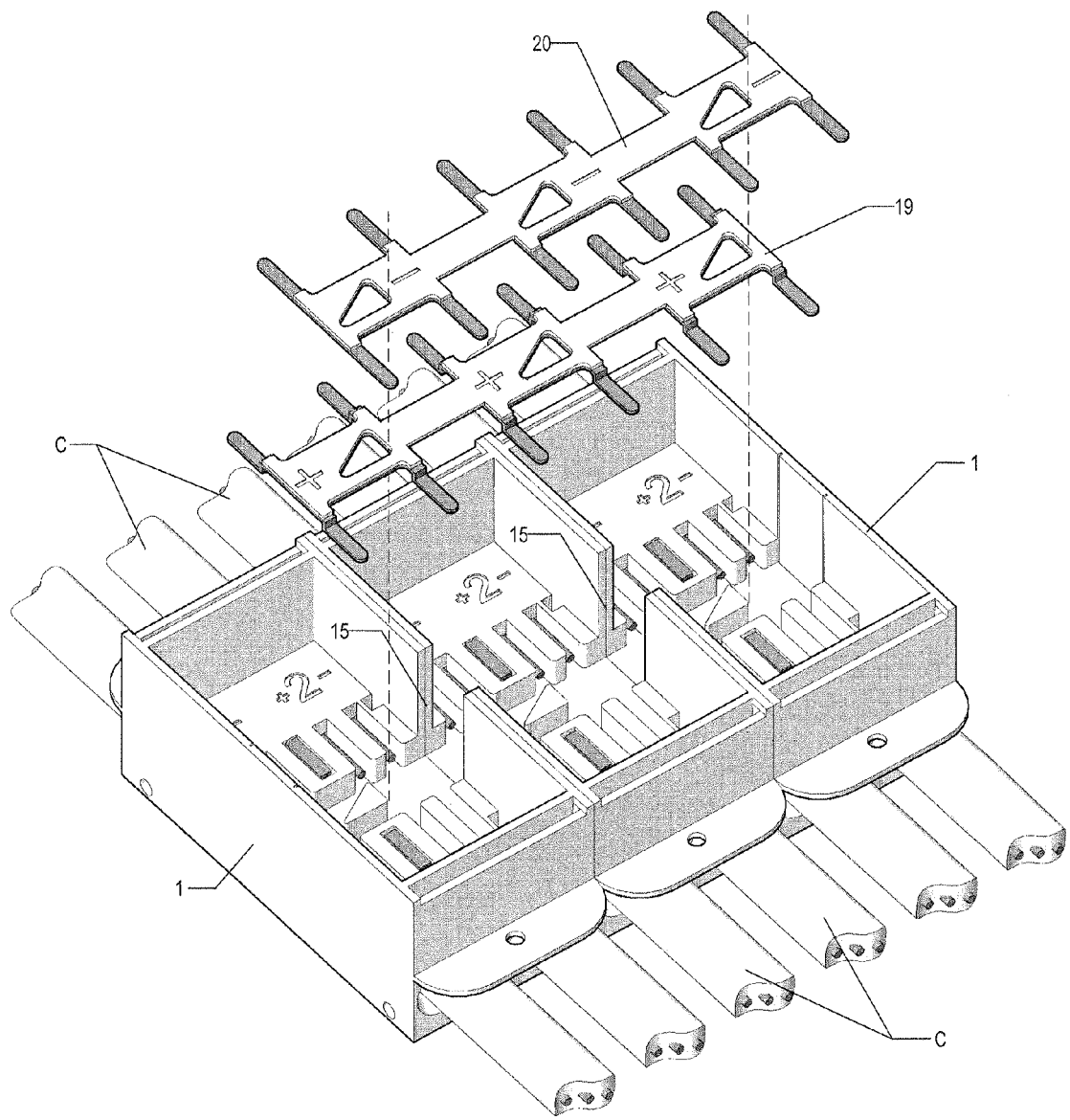
FIG. 6 is an exploded isometric view of several bases in accordance with the present invention in side by side relation with elongated side openings that allow extended links to be installed therein.

FIG. 6 shows laterally connected bases 1 with elongated side openings 15 for receiving extended links 19, 20, and the trimmed-leg links for different circuits.

Figure 7:
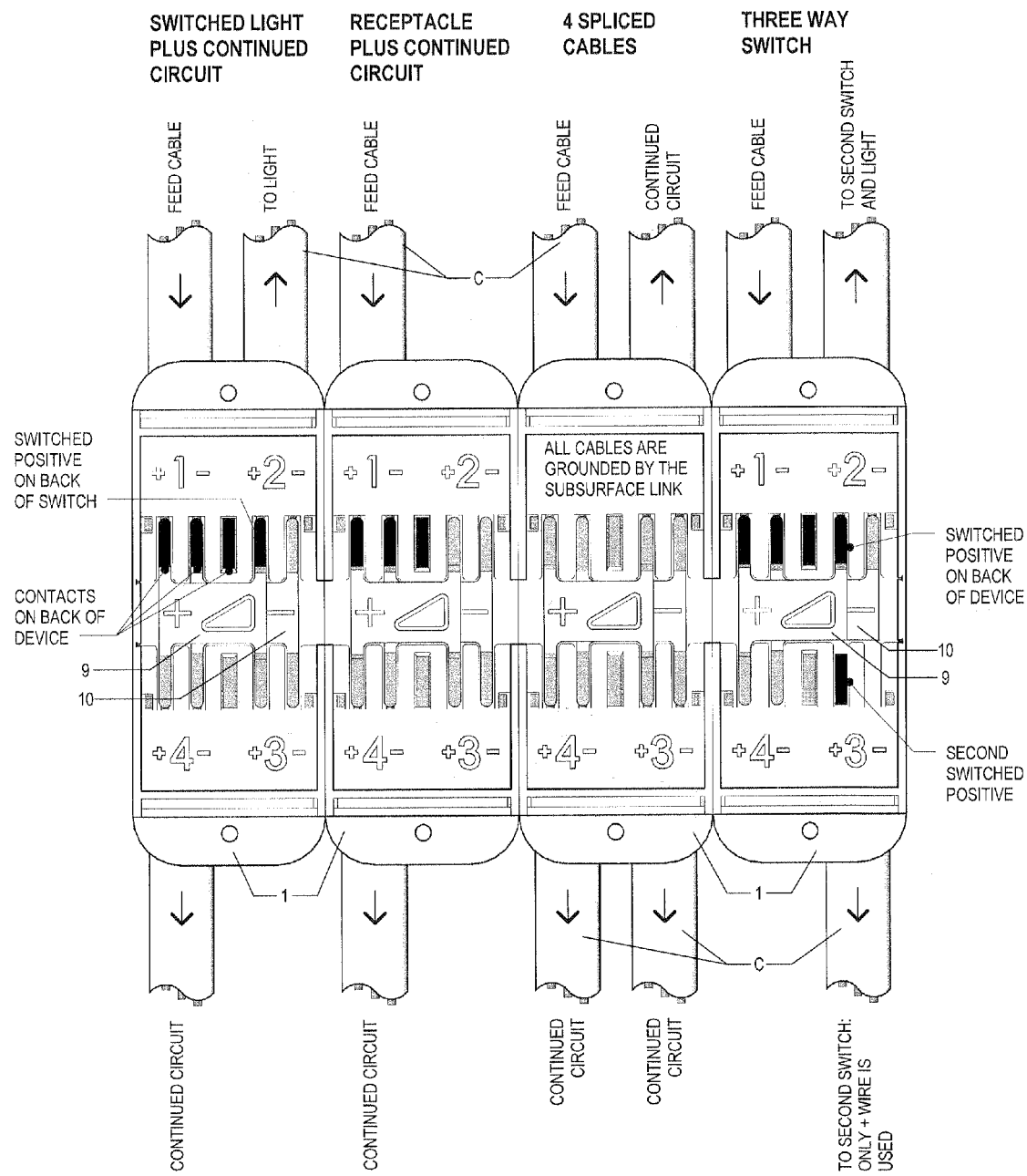
FIG. 7 is a front elevational view of side by side bases with different types of circuit connections formed by the installed links.

FIG. 7 shows bases in accordance with the present invention in which different connections are made by the links in each base.

The following features of the present invention are apparent from the foregoing description:

Simpler Circuit Connections
  Simpler wiring to devices, additional circuits, three-way circuits, half-switched receptacle circuits, through circuits, branch circuits, relay circuits, and other complex circuits, all of which are more common today than a single device connected to a single cable.

Increased Safety
  Conductor connections are clearer, more easily traced, more secure, and easier to accomplish than current technology: cables, wires, wire nuts, pigtails, and unprotected grounds, all bent and forced back into a junction box in the remaining space around and behind the device
  All cables and devices are automatically grounded;
  Accidental connection or reversal of positive and neutral conductors is physically prevented;
  Devices are easier to install without circuiting errors;
  The need for junction-box-cubic-inch and wire-nut-gauge-capacity calculations is eliminated; and
  Cable, conductor, and circuit routes are visually obvious without disassembly.

Easier Installation
  Can be assembled elsewhere (out of construction site weather and at a more convenient working height than most receptacles and light fixtures);
  Either cables or devices can be installed first (currently junction boxes are installed first and cannot be repositioned later);
  Reduces the number of parts and pieces, connection operations, and installation time;
  Eliminates a separate junction box by the device itself serving the same protective and enclosure functions (a variant of the current NEC standard of 6" of free conductor between cable entry to the box and the device—the invention and the protective enclosure box can be one);
  Eliminates finger and tool work inside a very small box;
  Compatible with today's typical device designs: stab-in terminals on the back, dual screw terminals on the sides;
  Compatible with today's typical device constructions: stab-in terminals on the back, dual screw terminals on the sides;
  Easily ganged several in a row with internal circuit connections; and
  Self-locking and easy-release cable entries Together these features achieve:
  1. Simpler wiring of devices to circuits, additional circuits, three-way circuits, half-switched receptacle circuits, through circuits, split circuits, relay circuits, and other common complex circuits;
  2. Decreased opportunity for short circuits due to connections that are more organized, consistently located, visible, secure, and easier to accomplish than current art;
  3. Certain grounding for all cables and devices;
  4. Reduced possibility for accidental connection to, or reversal of, positive and neutral conductors (A cable can be inserted with the wrong polarities, but so long as the base labels are followed incorrect connections are not physically possible.);
  5. Increased safety by elimination of junction-box-size, number-of-entering-connectors, and wire-nut-gauge capacity calculations (three NEC requirements);
  6. Increased safety since all electrical connections are totally enclosed in the completed assembly;
  7. Increased moisture and corrosion resistance since a simple gasket (not shown) can enclose all conductors;
  8. Observable cable, conductor, and circuit routes without circuit disassembly;
  9. All but the cables can be assembled in a shop (out of construction site weather conditions and at a more convenient working height than most receptacles and light fixtures);
  10. Either cables or devices can be installed first (currently junction boxes are typically installed first and cannot be more accurately positioned as finish elements are installed);
  11. Reduction of the number of parts and operations, and consequently installation time;
  12. Enclosure of cables, wires, and device connections so that the invention qualifies as an NEC junction-boxless "wiring device," reducing the material, time, and cost of installation;
  13. Elimination of complex work inside a small box with fingers and tools;
  14. Compatibility with today's typical device designs: stab-in terminals on the back, dual screw terminals on the sides;
  15. Easy ganging of several inventions in a row with internal link connections; and 16. Self locking and easy-release cable latches, operable from the room without disassembling the circuits.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Electrical wiring apparatus, comprising:
a base having an outer opening;
said base having a first cable entry at a first end thereof and a second cable entry at a second end thereof, said first and second cable entries being constructed to removably retain stripped ends of cables therein that each have a positive wire, a neutral wire and a ground wire;
the positive wire and neutral wire of each cable being exposed on the base when the cable is positioned in the cable entry;
a mounting post secured to said base and extending outwardly therefrom toward the outer opening thereof;
a first link of electrically conductive material slidably mounted on said mounting post in a first position and having first legs engaging and connecting the exposed positive wires of said cables;
a second link of electrically conductive material slidably mounted on said mounting post over said first link in a second position offset from said first position and having second legs engaging and connecting the exposed neutral wires of said cables; and
said first and second links having electrical insulation thereon in areas other than said first and second legs to prevent electrical contact between said first and second links;
whereby a cover plate and/or an electrical device can engage said first and second links to retain them in electrical contact with the positive and neutral wires of said cables.

2. The electrical wiring apparatus of claim 1 wherein said base has a ground enclosure adjacent each cable entry for receiving the ground wire of a cable positioned in the cable entry.

3. The electrical wiring apparatus of claim 2 wherein the ground enclosure comprises a subsurface grounding link.

4. The electrical wiring apparatus of claim 1 wherein said base has a plurality of spaced recesses in an inner surface thereof adjacent to said mounting post, the positive wire of each cable being disposed in one of said spaced recesses and the neutral wire of each cable being disposed in another of said spaced recesses, said first legs being receivable in said one recess to connect the positive wires, and said second legs being receivable in said another recess to connect the neutral wires.

5. The electrical wiring apparatus of claim 4 wherein said spaced recesses in the inner surface of said base are elongated and in parallel relation to receive the legs of said links therein.

6. The electrical wiring apparatus of claim 1 wherein said first link has four first legs and said second link has four second legs.

7. The electrical wiring apparatus of claim 1 wherein a cover plate and/or associated electrical device is movably mounted on said base over the outer opening thereof.

8. The electrical wiring apparatus of claim 7 wherein the inner portion of said cover plate and/or associated electrical device comprises electrical terminals in engagement with the legs of said links and a ground terminal on said base.

9. The electrical wiring apparatus of claim 8 wherein the electrical device is an electrical receptacle.

10. The electrical wiring apparatus of claim 8 wherein the electrical device is an electrical switch.

11. The electrical wiring apparatus of claim 7, wherein said links have outwardly extending contact arms, and the inner portion of said cover plate and/or associated electrical device comprises electric terminals in engagement with the contact arms.

12. The electrical wiring apparatus of claim 1 wherein said mounting post has a predetermined cross section and each link has a center portion supporting said legs with an aperture therethrough for slidably receiving said mounting post, said aperture having a shape corresponding to the cross section of said mounting post.

13. The electrical wiring apparatus of claim 12 wherein the center portion of each link has electrical insulation thereon.

14. The electrical wiring apparatus of claim 12 wherein said legs are constructed to be removable from the center portion of each link.

15. The electrical wiring apparatus of claim 12 wherein the aperture in the center portion of the first link is offset from the aperture in the center portion of the second link.

16. The electrical wiring apparatus of claim 1 further comprising a plurality of bases connected to each other at side portions thereof and having elongated outwardly extending openings in said side portions, first and second links being mounted in each of said bases, said first links in the bases being connected by first arms that extend through said elongated openings in said side portions, and said second links in the bases being connected by second arms that extend through said elongated openings in said side portions.

* * * * *

UNITED STATES PATENT AND TRADEMARK OFFICE
CERTIFICATE OF CORRECTION

Page 1 of 1

PATENT NO.         : 9,246,321 B2
APPLICATION NO.    : 14/576731
DATED              : January 26, 2016
INVENTOR(S)        : Newill It is certified that error appears in the above-identified patent and that said Letters Patent is hereby corrected as shown below:

On the Title Page

(71) Applicant:

change

"Roger Fulton Newill, Virginia Beach, CA (US)"

to

--Roger Fulton Newill, Virginia Beach, VA (US)--

(72) Inventor:

change

"Roger Fulton Newill, Virginia Beach, CA (US)"

to

--Roger Fulton Newill, Virginia Beach, VA (US)--

Signed and Sealed this
Thirty-first Day of May, 2016

Michelle K. Lee
*Director of the United States Patent and Trademark Office*